United States Patent
Keller

[11] Patent Number: 5,466,093
[45] Date of Patent: Nov. 14, 1995

[54] METHOD AND APPARATUS FOR REMOVING CONTAMINANTS FROM A DUCT OR PIPE

[76] Inventor: Carl E. Keller, P.O. Box 9827, Santa Fe, N.M. 87504-9827

[21] Appl. No.: 243,179

[22] Filed: May 16, 1994

[51] Int. Cl.⁶ ..................................................... E21D 11/00
[52] U.S. Cl. ........................... 405/152; 156/293; 264/516
[58] Field of Search ............................ 166/310; 405/152; 156/293; 241/74; 264/516

[56] References Cited

U.S. PATENT DOCUMENTS

| | | | |
|---|---|---|---|
| 4,064,211 | 12/1977 | Wood | 264/95 |
| 4,366,012 | 12/1982 | Wood | 156/93 |
| 4,434,115 | 2/1984 | Chick | 264/36 |
| 4,456,401 | 6/1984 | Williams | 405/150 |
| 4,622,196 | 11/1986 | Wood | 264/229 |
| 4,680,066 | 7/1987 | Wood | 156/156 |
| 4,685,983 | 8/1987 | Long | 156/64 |
| 4,776,370 | 10/1988 | Long | 138/98 |
| 4,778,553 | 10/1988 | Wood | 156/287 |
| 5,176,207 | 1/1993 | Keller | 166/64 |

Primary Examiner—Roger J. Schoeppel

[57] ABSTRACT

Contaminants are removed from the interior or a duct by the introduction within the duct of a tube having a coating of a curable, strippable resin using an everting/inverting membrane assembly. The coated tube is contained within the inverted membrane assembly and urged against the walls of the duct as the membrane is everted. The coated tube extends through an open end of the duct and is secured to the duct to retain the tube within the duct. The membrane is again inverted for the resin to cure and adhere contaminants to the tube. Another membrane assembly is then everted with the tube, the tube is secured to the membrane assembly, and withdrawn within the membrane as the membrane is inverted from within the duct. The contaminants are contained with the inverted membrane for analysis or disposal. In one embodiment, a towing membrane assembly is inserted through a second open end of the duct and attached to the tube-carrying membrane. The towing membrane assembly is inverted and the tube-carrying membrane is everted to assist the tube-carrying membrane to negotiate bends and junctions within the duct assembly.

8 Claims, 5 Drawing Sheets

METHOD AND APPARATUS FOR REMOVING CONTAMINANTS FROM A DUCT OR PIPE

BACKGROUND OF THE INVENTION

This invention relates to removing contaminants from a duct, pipe, or the like, and, more particularly, to removing contaminants from a duct, pipe, or the like, using everting membrane assemblies.

The nuclear industry and many other industries that process hazardous materials use special ventilation systems to protect workers from dust and vapors associated with handling and machining the hazardous substances. An important component of ventilation systems is ducting or piping for moving vapors and particles from the workplace to a plenum volume that contains high efficiency particle absorber (HEPA) filters for removing the hazardous materials from the air flow.

These ducts and pipes then collect residual particles that were not carried to the filters. The hazardous particles contaminate the interior of the ducts and pipes and must be periodically removed from the interior of the ducts and pipes, and certainly must be removed when the ducts and pipes are removed from the workplace. One method for removing adherent contaminates is sandblasting interior portions of the ducts or pipes, with a concomitant risk of particulate spread and contamination of workers.

One possible approach to this problem would be to install a liner to contain the contamination between the duct or pipe and the liner. U.S. Pat. No. 4,778,553 to Wood describes a method for lining a pipe with a flexible tubular sleeve, generally for the purpose of rehabilitating older pipes. As taught by Wood, a fibrous liner material is impregnated with a curable synthetic resin and the liner is installed over a carrier tube. The carrier tube is then everted into the pipe to install the liner along the pipe wall. Hot water is introduced within the carrier tube to cure the resin in the liner material to cause the liner to become rigid along the pipe wall. The carrier tube may then be withdrawn from within the liner. It will be understood, however, that the entire pipe must then be treated as a contaminated object for subsequent disposal.

Ventilation systems are frequently complex, with numerous bends and branches. An impregnated fibrous liner would be expected to have an increased resistance for movement along the pipe so that considerable internal pressure may be required to evert the carrier tube within the pipe. Wood teaches the use of a pull through cable, or the like, to attach to the everting carrier tube, whereby a pull on the cable assists the eversion process. But the cable merely drags along the pipe interior and, if contamination is present, either spreads the contamination or becomes contaminated in an unconfined manner.

The present invention is directed to these problems and enables duct and pipe wall contamination to be removed from the duct or pipe in a confined manner. Accordingly, it is an object of the present invention to use everting membrane assemblies to remove contamination from a duct or pipe while confining the contamination within the membrane assembly.

Another object of the present invention is to enable the use of a relatively high pressure membrane for installing an impregnated contaminant-trapping fabric.

One other object of the present invention is to assist in the installation of an impregnated fabric while maintaining confinement of any contamination.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise an everting membrane assembly for removing contaminants from a duct, pipe, or the like, having walls that define first and second open ends. A first everting membrane has a length effective for everting the membrane from the first open end of the duct through said second open end. A tube of porous material is impregnated with a strippable resin and has an insertion end for accepting said first membrane and a retainer end for securing to the second open end of the duct.

In another characterization of the present invention, contaminants are removed from the interior of a duct, pipe, or the like, having walls defining first and second open ends. A tube of porous material is impregnated with a curable, strippable resin, where the tube has an insertion end and a retainer end. A first everting membrane is everted through the insertion end of the tube to the retainer end. The tube is inverted within the first everting membrane. The membrane is then everted through the first open end of the duct to extend the retainer end of the tube through the second open end of the duct. The membrane is pressurized to urge the impregnated tube into contact with the walls of the duct. The retainer end of the tube is secured to the second open end of the duct and the first membrane is inverted from within the tube. The resin adheres the tube to the walls of the duct while the resin cures. The resin is cured to adhere contaminants on the walls of the duct to the tube. A second everting membrane is inserted into the first open end of the duct and everted within the tube through the second open end of the duct. The retainer end of the tube is then secured within the second everting membrane and the second membrane is inverted to withdraw the tube and contaminants from within the duct while confining the contaminants within the second membrane.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1 pictorially illustrates operation of an everting membrane within a duct, pipe, or the like.

FIGS. 3a, 3b, and 3c illustrate in cross-section the installation of an impregnated tube within a contaminated duct, pipe, or the like.

DETAILED DESCRIPTION OF THE DRAWINGS

Figure 1:
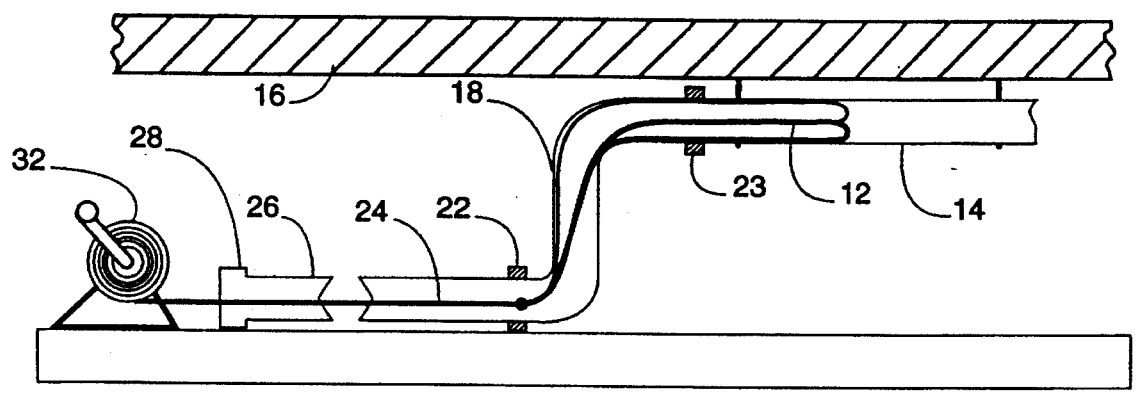

In accordance with the present invention, an everting/inverting membrane assembly provides for the installation and removal of a strip-coat from the interior of a duct, pipe, or the like. As used in this application, the term duct will be construed to cover ducts, pipes, and like structures that are used in ventilation systems. FIG. 1 graphically depicts everting membrane 12 within duct 14, which is suspended from ceiling 16. Membrane 12 may be either everting to place an impregnated tube within duct 14 or may be inverting to remove an impregnated tube from duct 14 with contaminated particles adhered to a cured resin.

In one embodiment, one end of membrane 12 is connected to canister 26 adjacent coupler 22 and membrane 12 extends from coupler 22 through adapter 18 to within duct 14. Adapter 18 joins with duct 14 at coupler 23. The other end of membrane 12 is connected to tether 24, which extends through end cap 28 of canister 26 to reel 32. Thus, the interior of canister 26 may be pressurized to evert membrane 12 within duct 14 and tether 24 may be retracted onto reel 32 to invert membrane 12 from within duct 14 and back into canister 26. Adapter 18 is provided to transition between duct 14 and canister 26, which may be simply supported on a floor beneath duct 14.

Figure 2A:
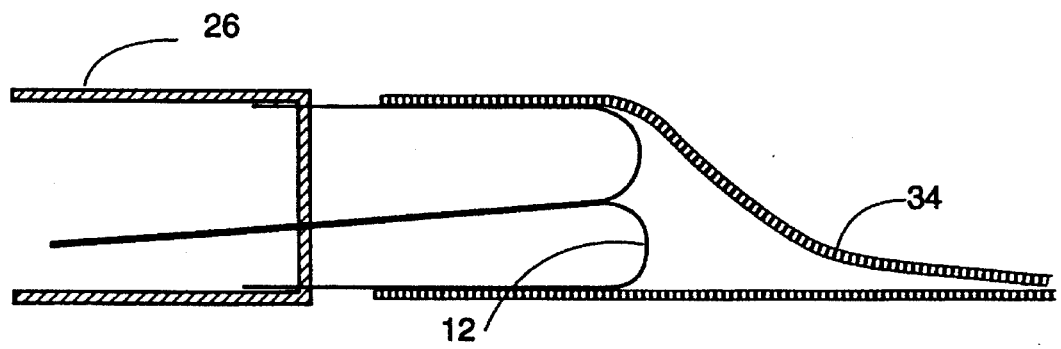
FIGS. 2a, 2b, and 2c illustrate in cross-section the installation of an impregnated tube within an everting membrane assembly.
Figure 2B:
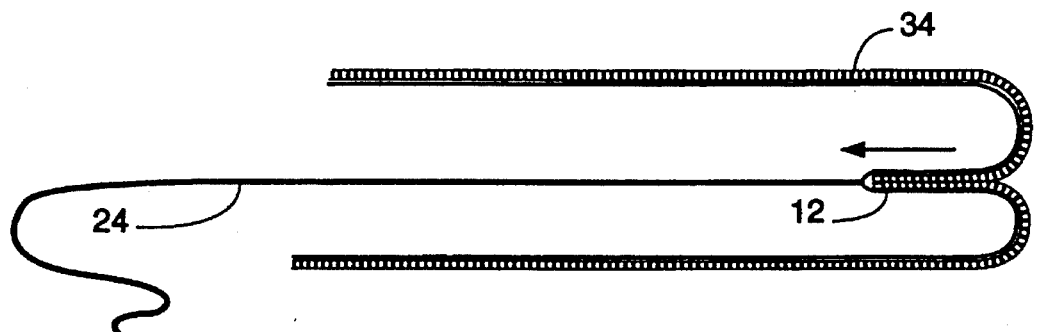
Figure 2C:
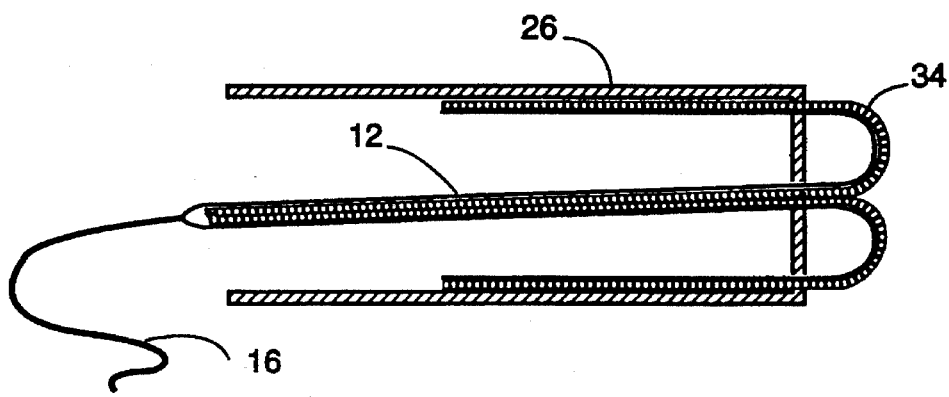

FIGS. 2a, 2b, and 2c illustrate the insertion of everting membrane 12 within impregnated fabric tube. Fabric tube 34 is a porous fabric, e.g., felt, flannel, muslin, or the like, that is saturated with a strip-coat fluid, e.g., a latex compound, that cures in air. Membrane 12 is preferably a coated fabric that can be pressurized. The side of membrane 12 that contacts tube 34 may be coated with urethane, polyvinylchloride, teflon, or other similar materials that release from the strip-coat fluid. Membrane 12 is everted from canister 26 into an open first end of tube 34 (FIG. 2a) to extend almost to the open second end of tube 34. The second end of tube 34 is secured within the everted membrane 12. Preferably, the second end is simply pushed within the end of everted membrane 12 and held in place by contact between membrane 12 and the strip-coat fluid. Membrane 12 is then inverted by pulling on tether 24 to invert tube 34 within membrane 12 (FIG. 2b). In the final inverted condition, membrane 12 is within canister 26 and tube 34 is within membrane 12.

Figure 3A:
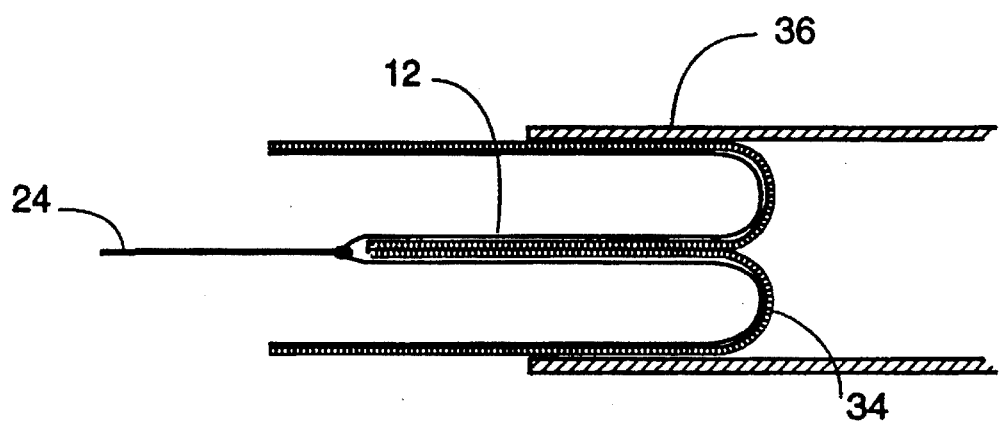
Figure 3B:
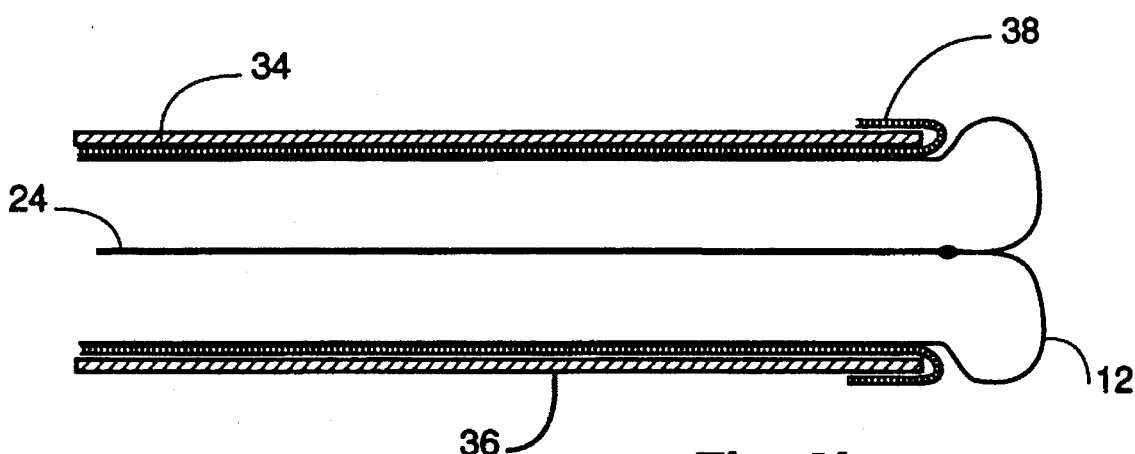
Figure 3C:
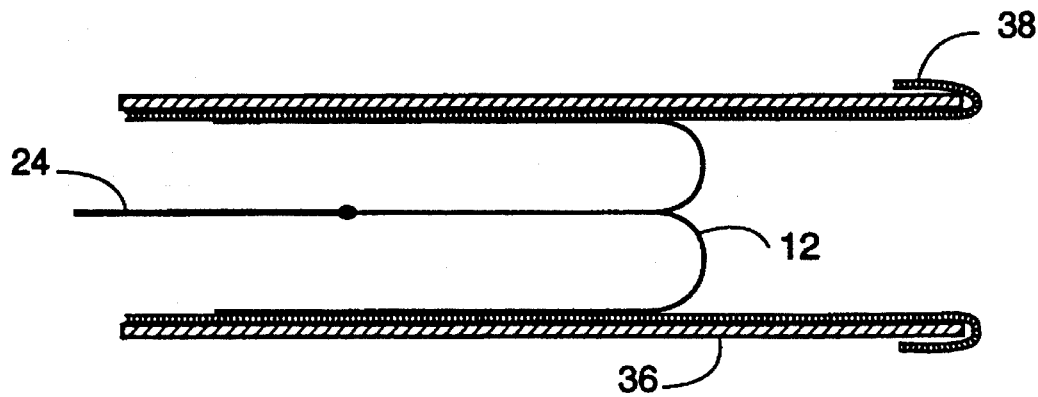

Fabric tube 34 must now be inserted within a contaminated duct, as shown in FIGS. 3a, 3b, and 3c, for the strip-coat material to adhere to contaminated particles as the material cures. Membrane 12 is placed adjacent a duct 36 and canister 26 (FIG. 1) is pressurized to eyed membrane through a first open end of duct 36 and within duct 36. As membrane 12 everts, fabric tube 34 also everts and is urged against the interior walls of duct 36 by pressurized membrane 12 (FIG. 3a). Membrane 12 everts until it extends through a second open end of duct 36 to extend the second open end of tube 34 beyond the second open end of duct 36. The second open end of tube 34 is then folded back over the second open end of duct 36 to form cuff 38 to retain tube 34 within duct 36 (FIG. 3b).

Membrane 12 is then withdrawn from within tube 34 by withdrawing tether 24 to invert membrane 12. Cuff 38 prevents tube 34 from being carried with membrane 12. The surface tension of the strip-coat material carried by tube 34 tends to hold tube 34 to the wall of duct 36 since the strip-coat material does not adhere to the release materials that coats membrane 12 (FIG. 3c). Membrane 12 is fully inverted within canister 26 (FIG. 1), exposing the strip-coat material carried by tube 34 to air for curing the material.

Figure 4:
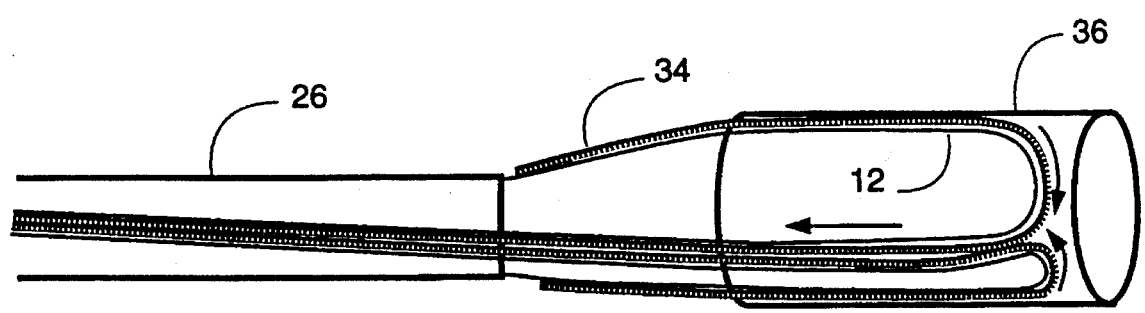
FIG. 4 illustrates the removal of an impregnated tube from within a duct or pipe.

When strip-coat material has cured, contaminants within a duct will be adhered to the strip-coat material. Membrane 12 is again everted through a first open end of tube 34, as shown in FIG. 4. Once membrane 12 extends through the second open end of duct 36, cuff 38 (FIG. 3c) is released from the second open end of duct 36 and secured within membrane 12. As membrane 12 is now inverted, tube 34 is stripped from the walls of duct 36 and is enveloped by membrane 12 as membrane 12 is inverted. Any contaminants adhering to the strip-coat material carried by tube 34 are confined within membrane 12 for possible analysis and disposal. Membrane 12 that is used to remove tube 34 may be formed of a material different from the material that forms the membrane 12 shown in FIGS. 2a–c and 3a–c for inserting tube 34 within duct 36. For example, only light weight material is needed since high pressures are not required and a release surface is not required since tube 34 will be returned within membrane 12. A suitable material is polyethylene or other inexpensive, lightweight plastic film. Membrane 12 with the removed contaminants may be safely removed from canister 26 (FIG. 1) for further analysis and disposal.

Figure 5A:
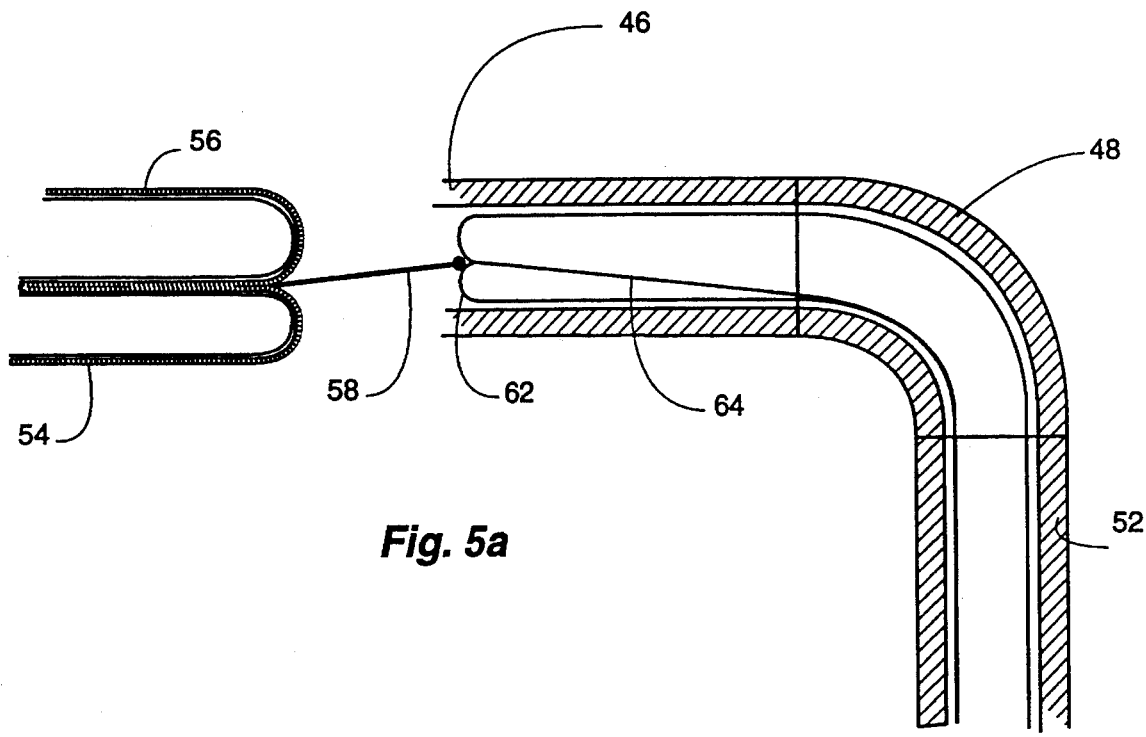
FIGS. 5a and 5b illustrate in cross-section the use of a towing membrane to assist in installation of a first membrane assembly with an impregnated tube.
Figure 5B:
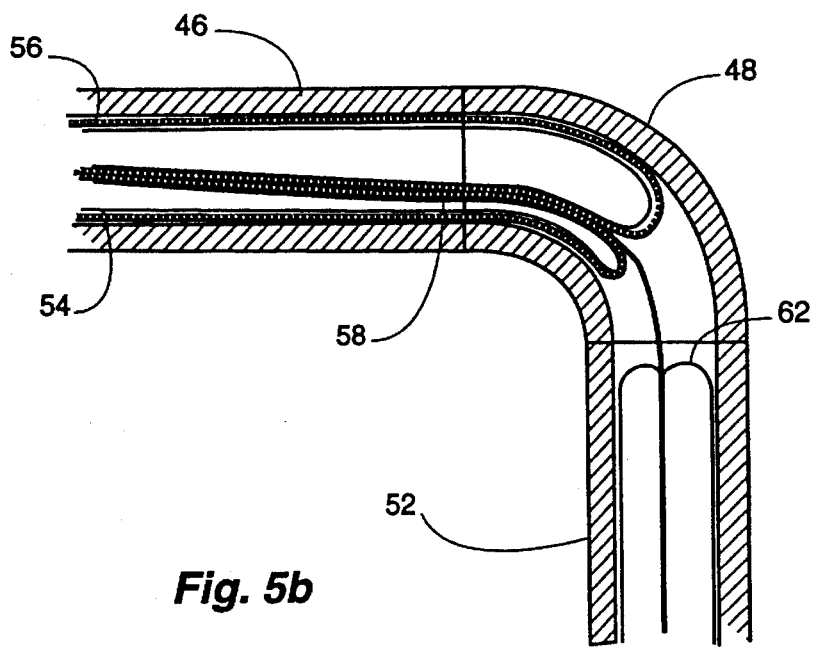

In one embodiment of the invention, shown in FIGS. 5a and 5b, a towing membrane assembly assists a first membrane assembly with a saturated fabric tube to traverse a duct assembly that contains numerous joints and bends. It will be appreciated that a membrane carrying a coated fabric tube may not easily traverse a duct assembly because of the adhesion of the tube to the duct walls and the stiffness of the pressurized, layered system. As shown, a section of a duct assembly is illustrated by duct sections 46 and 52 joined by a bend 48. First everting membrane assembly 54 carries impregnated fabric tube 56 and further includes tow line 58 that is connected to the closed end of membrane assembly 54. Towing everting membrane assembly 62 everts through a duct assembly to a position for securing tow line 58. Tow line 58 may be simply placed within an inverted portion of membrane 62 or may be secured to the end of tether 64 (FIG. 5a).

After first everting membrane assembly 54 is attached to towing everting membrane assembly 62, tether 64 is retracted to invert membrane assembly 62 and assist membrane assembly 54 to traverse duct sections 46, 48, and 52 as membrane assembly 54 is pressurized and everted (FIG. 5b). Any contaminants that are loosened by the movement of membrane assemblies 54 and 62 through the duct will be contained between the two membranes and captured by the strip-coat material carried by tube 56.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for removing contaminants from a duct or pipe, having walls defining first and second open ends, comprising the steps of:

forming an inverted first everting membrane assembly consisting of a tube of porous material having an insertion end and a retainer end and saturated with a strip-coat fluid and a first everting membrane containing said tube;

everting said first membrane assembly into said first open end of said duct and through said second end to urge said tube against said walls of said duct;

securing said retainer end of said tube to said second open end of said duct while inverting said first membrane from within said tube;

curing said strip-coat fluid to adhere contaminants on said walls of said duct to said tube;

everting a second everting membrane into said first open end of said duct within said insertion end of said tube and through said second open end; and inverting said second everting membrane to withdraw said tube and said contaminants from said duct.

2. The method of claim 1, wherein said step of securing said retainer end of said tube to said second end of said duct comprises folding said retainer end over said second open end of said duct.

3. The method of claim 1, further including the step of securing said retainer end of said tube within said second everting membrane prior to inverting said second everting membrane.

4. A method according to claim 1, further including the steps of:

everting a towing membrane into said second open end of said duct and extending through said first open end of said duct;

securing said first everting membrane to said towing everting membrane; and everting said first membrane while inverting said towing membrane to assist movement of said first membrane and said tube through said duct.

5. A method according to claim 2, further including the steps of:

everting a towing membrane into said second open end of said duct and extending through said first open end of said duct;

securing said first everting membrane to said towing everting membrane; and everting said first membrane while inverting said towing membrane to assist movement of said first membrane and said tube through said duct.

6. A method according to claim 3, further including the steps of:

everting a towing membrane into said second open end of said duct and extending through said first open end of said duct;

securing said first everting membrane to said towing everting membrane; and everting said first membrane while inverting said towing membrane to assist movement of said first membrane and said tube through said duct.

7. An everting membrane system for removing contaminants from a duct or pipe, having walls defining first and second open ends, said system comprising:

a first everting membrane having a length effective for everting said membrane from said first open end of said duct to extend through said second open end; and a tube of porous material saturated with a strip-coat fluid and having an insertion end for accepting said first membrane and a retainer end for securing to said second open end of said duct.

8. An everting membrane system according to claim 7, further including:

a towing membrane effective for everting from said second open end of said duct through said first open end; and means for securing said first membrane to said towing membrane so that inverting said towing membrane assists said first membrane to traverse said duct as said first membrane everts.

\* \* \* \* \*